United States Patent [19]

Kubota et al.

[11] Patent Number: 4,830,747

[45] Date of Patent: May 16, 1989

[54] FILTER APPARATUS FOR REMOVING PLANKTON

[75] Inventors: Misao Kubota, Maruko; Osamu Sugai, Izumi; Tetsuo Goto, Sendai; Kenji Shimada, Ueda; Toshiaki Yamaguchi, Tobu; Kikuo Koizumi, Soka, all of Japan

[73] Assignees: Totoku Electric Co., Ltd., Tokyo; Totoku Electric Power Company, Incorporated, Miyagi, both of Japan

[21] Appl. No.: 88,058

[22] Filed: Aug. 21, 1987

[30] Foreign Application Priority Data

Aug. 28, 1986 [JP] Japan ................. 61-202161
Jul. 9, 1987 [JP] Japan ................. 62-171444

[51] Int. Cl.⁴ .................. B01D 29/10; B01D 29/34; B01D 29/48
[52] U.S. Cl. .................. 210/203; 210/333.1; 210/334; 210/346; 210/411; 210/486; 210/497.1; 134/22.12; 119/1
[58] Field of Search ............ 210/203, 205, 260, 333.1, 210/334, 346, 410, 411, 486, 488, 494.2, 497.01, 497.1, 497.2; 134/11, 12, 22.11, 22.12, 22.1, 31, 34, 35; 119/1, 2, 3

[56] References Cited

U.S. PATENT DOCUMENTS

| | | | |
|---|---|---|---|
| 1,892,093 | 12/1932 | Battistella | 124/22.12 |
| 2,468,603 | 4/1949 | Pew | 210/152 |
| 2,729,340 | 1/1956 | Harms | 210/184 |
| 2,748,950 | 6/1956 | Tursky | 210/497.1 |
| 3,768,200 | 10/1973 | Klock | 47/1.4 |
| 4,210,538 | 7/1980 | Tantilla et al. | 210/333.1 |
| 4,405,466 | 9/1983 | Giannelli et al. | 210/411 |
| 4,439,327 | 3/1984 | Müller | 210/333.1 |
| 4,456,531 | 6/1984 | Kubota et al. | 210/409 |
| 4,517,086 | 5/1985 | Romey et al. | 210/334 |
| 4,552,669 | 11/1985 | Sekellick | 210/333.01 |

FOREIGN PATENT DOCUMENTS 1437727 3/1966 France .
2196839 3/1974 France .

OTHER PUBLICATIONS

Japanese IERE Council No. 499, "The Biology of the Mussel Mytilus Edulis in Relation to Fouling Problems in Industrial Cooling Water Systems", by H. A. Jenner.

Primary Examiner—Richard V. Fisher
Assistant Examiner—Wanda L. Millard
Attorney, Agent, or Firm—Frishauf, Holtz, Goodman & Woodward

[57] ABSTRACT

A filter apparatus for removing plankton out of fresh or sea water containing the plankton. The filter apparatus comprises a filter housing provided with a partition plate having a plurality of through-holes thereby to partition the housing into a non-filtrate chamber and a filtrate chamber. A plurality of filter elements, each having open top end, a filter portion and non-filter portion, which are fitted in the through-holes of the partition plate to protrude the open top ends into the filtrate chamber. Plankton in the water are concentrated at the non-filter portion disposed near the partition plate and removed through an opening provided at a portion of the non-filtrate chamber near the partition plate.

11 Claims, 3 Drawing Sheets

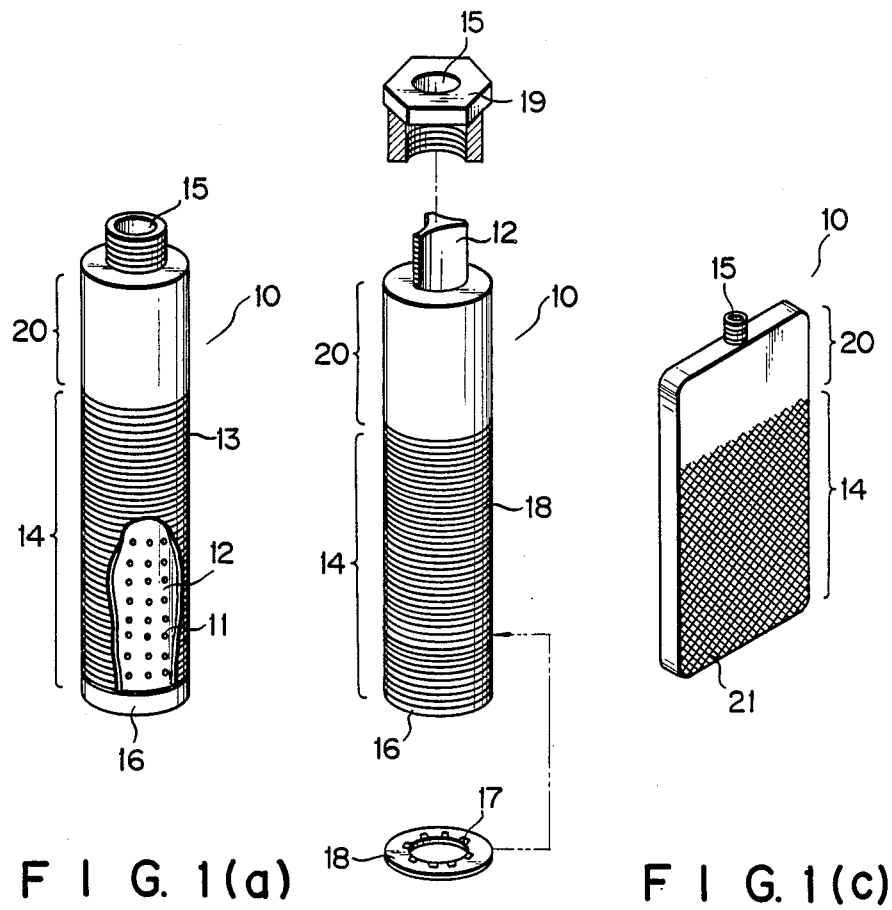
F I G. 1(a)  F I G. 1(b)  F I G. 1(c)

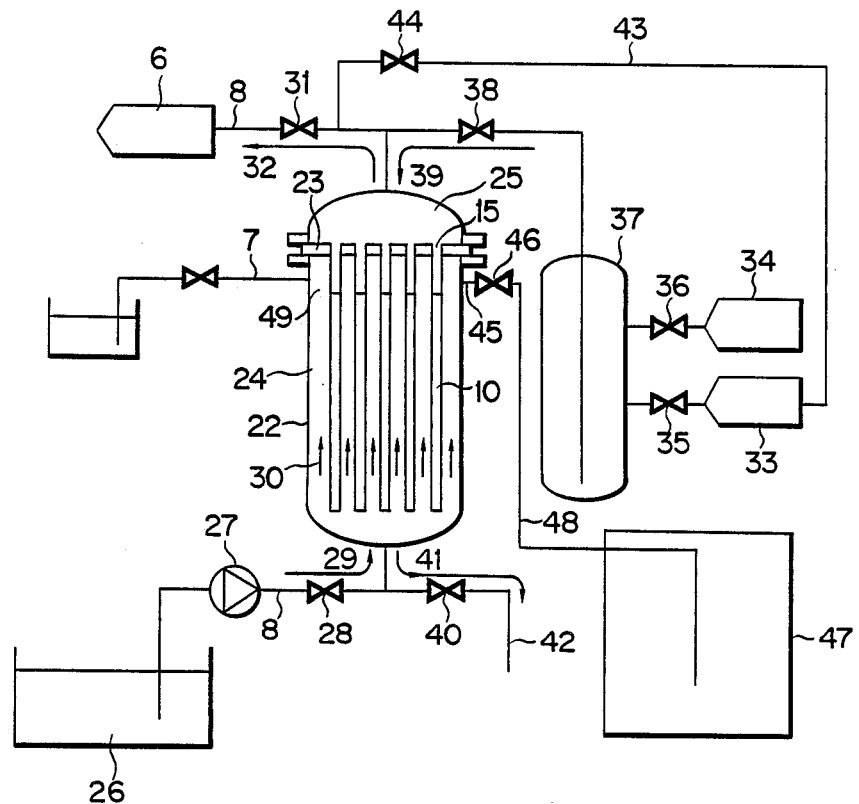
F I G. 2

FILTER APPARATUS FOR REMOVING PLANKTON

BACKGROUND OF THE INVENTION (i) Field of the Invention

The present invention relates to a filter apparatus for condensing and separating plankton from sea water, so as to use the plankton as a natural feed for an ocean culture or to return the plankton back to sea water to protect marine livings and at the same time to use the filtrate as cooling water in power plants or as fresh water purified from sea water.

(ii) Description of the Prior Art

A large amount of cooling water is used in steam and atomic power plants to cause a steam condenser to condense, into water, steam used for turbine rotation. A typical example of a cooling water source is sea water, which is an inexhaustible source. However, since various types of marine living organisms and substances having various shapes and sizes are contained in sea water, the water must therefore be filtered by a settling basin or a strainer. The filtrate as a cooling medium is then supplied through a water supply pipe to the steam condenser. FIG. 3(a) is a block flow chart illustrating the pretreatment of salt water. Sand particles and shells mixed in with salt water entering through inlet port 1 are removed by settling basin 2. Large objects are then removed by bar screen 3, and relatively small objects are removed by rotary screen 4. The filtrate is then supplied to steam condenser 6 through water supply pipe 8. However, in the course of the conventional pretreatment, marine microorganisms such as plankton living in salt water cannot be captured or removed. Thus, the plankton are conveyed to condenser 6 through pipe 8, and larvae of Mussels (Mytilus edulis) and Balanus become adhered or attached to the inner wall surfaces of pipe 8 and condenser 6. In the worst case, the larvae form a 20 cm thick layer on the inner wall surface, clogging the water channel and thus decreasing the amount of water supplied and degrading the heat exchange efficiency. In addition, the heat exchange pipe becomes clogged up with peeled-off shells, and the power generating efficiency is degraded. In order to perform periodic maintenance, a chemical containing free chlorine is used to weaken shells attached to the inner wall surfaces, and the weakened shells being removed by peeling them off. Another conventional maintenance procedure is to apply an anticontamination paint containing copper suboxide and an organic tin compound having a high toxicity to the inner wall surfaces of pipe 8 and condenser 6, thereby preventing adhesion of shells thereto.

Since the above-mentioned maintenance procedures must be performed on a large-scale basis, each time a water supply pump has been deactivated, this results in high maintenance costs. In addition, the marine living organisms may be totally annihilated by the process. In an application of the anticontamination paint, the concentration and thickness of the paint that can be applicable are limited, and its effectiveness period is short. In addition, the mechanical strength and adhesion strength of the paint film are not satisfactory. As a result, the desired effect is not always obtained. In addition, marine living organisms such as fish, shells, and sea weed become contaminated by such a paint, which gives rise to environmental pollution. In recent years, this environmental pollution poses a problem that should be immediately solved.

Larvae of organisms such as Mussels attach themselves to the surfaces of various equipment by means of a sticky disk formed by the hardening of secretory materials from their byssuses. Therefore, use of a microstrainer made of a material having a low interface tension, such as silicon and Teflon, has been proposed for the purpose of preventing attachment of larvae to equipment surfaces. In this case, however, a slime or the like becomes attached to the inner wall surfaces, and good surface conditions cannot be maintained. The slime or the like adheres to the strainer, causing it to become clogged. We are confronted with a circumstance wherein the ocean culture of fishes and shells must be widely prevailed to assure the ocean protein sources due to limitations of fishing grounds. However, the conventional techniques are incapable of assuring the supply of a low-cost natural live feed required for the ocean culture.

SUMMARY OF THE INVENTION

The present invention has been developed to solve the above conventional problems. Objects contained in sea water supplied from water supply port 1 are removed through settling basin 2, bar screen 3, and rotary screen 4, and the filtered sea water is fed to filter apparatus 5 in accordance with the characteristic feature of the present invention, as shown in FIG. 3(b). Small objects and marine microorganisms are filtered out of the sea water, and the resultant filtrate is supplied to steam condenser 6 through water supply pipe 8. Meanwhile, plankton concentrated by a non-filtrate vessel in filter apparatus 5 are extracted from microorganism extraction port 7 and are utilized as natural feed for other marine livings, or returned as alive back to the ocean.

Filter elements used in filter apparatus 5 of the present invention are respectively shown in FIGS. 1(a), 1(b), and 1(c). Filter element 10 shown in FIG. 1(a) comprises filtering portion 14, opening 15, and sealing portion 16. Filtering portion 14 comprises helical member 13 forming uniform slits on the surface of core 12 provided with apertures 11. Opening 15 is formed at one end of filter element 10, and sealing portion 16 is formed at the other end thereof. The filtrate passing through the slits is taken out of opening 15. Core 12 may be a cylindrical pipe, a polygonal pipe, or a rib-like frame for supporting the helical member. A wire for forming helical member 13 on the surface of core 12 may one having a circular cross section, a wedge wire, or a wire having any other shape. Each of the slits between each turn of helical member 13 has a width of 1,000 $\mu$m or less and preferably 300 $\mu$m or less, and the slits are maintained a uniform width. FIG. 1(b) shows another filter element. This element comprises triangular rod core 12, filtering portion 14, and threaded mouthpiece 19. Filtering portion 14 is constructed by stacking rings 18 on core 12. Each ring 18 has a plurality of projections projecting in a direction of thickness thereof. Mouthpiece 19 has opening 15. In addition to the element with slits for filtering water, filter element 10 shown in FIG. 1(b) may be modified as follows:

A plurality of nets having different mesh sizes and produced by arranged fine wires in a matrix form are stacked and baked, and the baked body is formed into a cylindrical shape.

Alternatively, a metal powder or small metal pieces are baked to thereby produce a porous cylindrical member, or else short metal fibers are baked to produce a cotton-like body which is then formed into a porous cylindrical member. In the above two members, water is filtered through a large number of voids, as is shown in FIG. 1(c). Leaf-like bag type filter element 10 has filtering portion 14 made of laminated net body 21.

Non-filter portion 20 without slits or voids, i.e., a closed pipe portion having no filtering function, is preferably formed near a partition plate mounting portion of filter element 10.

FIG. 2 shows an embodiment of a filter apparatus according to the present invention. A plurality of filter elements shown in FIG. 1(a), 1(b), or 1(c) are vertically mounted in filter housing 22 such that openings 15 face upward and sealing ends 16 face downward. Filter housing 22 is partitioned into non-filtrate chamber 24 and filtrate chamber 25, by means of partitioning plate 23. Sea water 26 from which objects have been removed through settling basin 2, bar screen 3, and rotary screen 4, is supplied by pump 27. Valves 28 and 31 are opened, in the direction indicated by arrow 29, to supply sea water 26 through water supply pipe 8 to non-filtrate chamber 24. Water 26 flows through the chamber 24 as streams 30 in parallel with the surfaces of filtering portions 14 of filter elements 10. As streams 30 of water 26 flowing in parallel with the surfaces of filtering potions 14 go upward through the chamber 24, filtering is effected through filtering portion 14. Meanwhile, water-standing portion 49 is formed near partition plate 23 of non-filtrate chamber 24. Plankton contained in sea water 26 remain in non-filtrate chamber 24 and flow along with streams 30 (upward streams, in the case illustrated) parallel to the surfaces of filtering portions 14. The plankton is concentrated in water-standing portion 49 and is recovered from microorganism extraction port 7. The concentrated microorganisms are then utilized as natural feed for other marine life. The plankton in non-filtrate chamber 24 is concentrated in water-standing portion 49 of water 26 which is formed near partition plate 23, as described above. If the portions near partitio plates 23 of filter elements 10 mounted thereon are constituted as closed pipe portions 20 having no filtering function, i.e., nonfilter portions 20, the plankton can be easily captured. Micro objects such as a slime of water are removed by filter elements 10, and the resultant filtrate as a cooling medium is supplied, in the direction indicated by arrow 32, to steam condenser 6, through valve 31 and water supply pipe 8. As filtering progresses, microobjects are stacked on the surfaces of filter elements 10, to increase a filtering resistance. When the internal pressure of non-filtrate chamber 24 reaches a predetermined level, or when a predetermined period of time has elapsed, valves 28 and 31 are closed, and microobjects stacked on the surfaces of filter elements 10 are washed with water flowing in the reverse direction. When valves 35 and 36 of reverse washing water tank 33 and reverse washing air tank 34 are opened, water is mixed with air in air/water mixing tank 37. When valves 38 and 40 are opened, the mixture of air and water bubble flow is fed in the direction indicated by arrow 39. The microobjects on the surface of filtering portions 14 of filter elements 10 flow together with the air/water mixture bubble flow through valve 40, in the direction indicated by arrow 41, and are drained off through drain pipe 42. Part of the filtrate is supplied as reverse washing water to reverse washing water tank 33 through conduit 43. Reference numeral 44 denotes a sepration valve for separating the filtrate reverse washing. Water supply to the filter apparatus is thus interrupted, the air/water mixture bubble flow is fed from openings 15 to filter elements 10, thereby removing the microobjects attached on the surfaces of filtering portions 14 of filter element 10. In periodical removal of organisms attached to the wall surfaces of non-filtrate chamber 24 and the surfaces of non-filter portions 20 of filter elements 10 over long-term operation of the apparatus, a means is provided to allow easy peeling off and removal of these organisms. Reference numeral 45 denotes a killing liquid supply port formed in non-filtrate chamber 24; 46, a separation valve; 47, a killing liquid tank; and 48, a conduit. The killing liquid is exemplified by hot water or steam which can kill the attached organisms without contaminating the marine environment. For example, hot water or steam heated to 40° C. or more can be employed. When the conventional chemical expellants are employed as the killing liquid, the shell organism would be forced to death with their shells being closed, thereby making the removal of the shell organism quite difficult. In contrast to this, when the hot water or steam heated to 40° C. or more is employed as the killing liquid, the shell organism would be forced to death with their shells being open, thereby making the removal of the dead shell organism very easy. Removal and cleaning off of organisms adhering to the inner wall surfaces of non-filtrate chamber 24 can be performed subsequent to the following procedures.

The operation of the filter apparatus is interrupted, and filtrate chamber 25 is emptied. Valve 46 is opened to supply the killing liquid from tank 47 into chamber 24 through inlet port 45. The liquid fills chamber 24, and valve 46 is closed. The apparatus is kept in this state for a predetermined period of time. Thereafter, the same operation procedures as in reverse washing operation mentioned above are performed to drain the killing liquid from chamber 24. In this manner, the organisms attached to the inner wall surfaces of chamber 24 are completely removed and drained off.

BRIEF DESCRIPTION OF THE DRAWINGS

FIGS. 1(a), 1(b), and 1(c) are respectively perspective views of filter elements used in a filter apparatus according to the present invention;

FIG. 2 is a diagram showing a filtering route of non-filtrate in the filter apparatus of the present invention;

DETAILED DESCRIPTION OF THE PREFERRED EMBODIMENTS

Figure 3A:
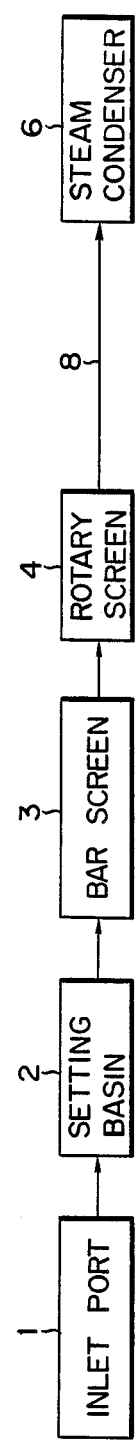
FIG. 3A is a block flow chart of a conventional pretreatment for supplying salt water as a cooling medium from a water supply pipe to a steam condenser.
Figure 3B:
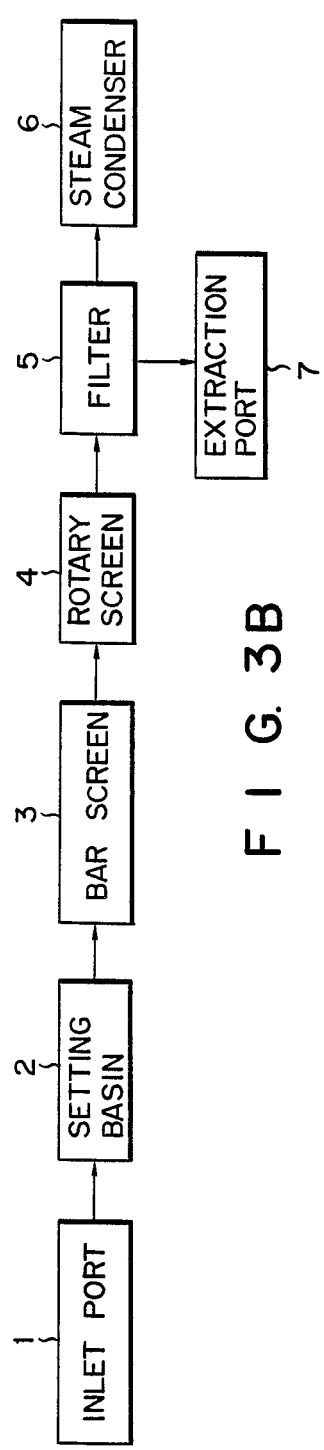
FIG. 3B is a block flow chart of a pretreatment for supplying salt water as a cooling medium from a water supply pipe to a steam condenser according to the present invention.

In order to confirm effects of the present invention, the following experiments were conducted.

Example 1

A 0.6-mm diameter stainless steel wire was wound around a surface of a stainless steel hexagonal core having a length of 750 mm and an outer diameter of 12 mm to form 70-$\mu$m wide slits up to 600 mm from one end of the core. A 150-mm long non-wired portion served as a non-filter portion. One end of the filter element was sealed, and the other end (on the non-filter portion side) thereof was open. Therefore, a filtering partition had a length of 600 mm and the surface area of the filtering portion was 0.022 m². Seven filter elements were vertically suspended on a partition plate in a transparent cylindrical glass filter housing having a volume of 10 l, thereby preparing a filter apparatus.

Sea water to be filtered was supplied by a pump and sea water filtering and condensation/separation of planktons were performed in the above apparatus. In this case, filtering conditions were given as follows. A filtering pressure ($\Delta P$) was 0.05 kg/cm², a filtering rate was 7.2 m³/m²·Hr, and thus a filtering volume per 90 minutes was 1.7 m³. Planktons including larvae of Mussels and Balanus were condensed and separated in a non-filtrate reservoir portion near the partition plate. In order to evaluate cleanness of the filtrate, the filtrate was filtered through a plankton net, and the net was observed with a microscope. No planktons were observed. The planktons condensed in the non-filtrate reservoir portion near the partition plate were recovered alive from the microorganism extraction port.

Example II

A 0.65-mm diameter Cu-10%Ni alloy wire was wound around a surface of a Cu-10%Ni alloy dodecahedral core having a length of 850 mm and an outer diameter of 30 mm to form 50μm wide slits up to 700 mm from one end of the core. A 150-mm long non-wired portion served as a non-filter portion. One end of the filter element was sealed, and the other end (on the non-filter portion side) thereof was open. Therefore, a filtering portion had a length of 700 mm and the surface area of the filtering porton was 0.065 m².

Four filter elements were vertically suspended on a partition plate in a cylindrical filter housing having a volume of 20 l, thereby preparing a filter apparatus.

The filter apparatus incorporated an automatic reverse washing mechanism for automatically cleaning filter elements by reverse washing when a flow rate reached 1.62 m³/Hr, an automatic filter resetting mechanism, an extraction port for extracting the condensed planktons alive near the partition plate, and adhered organism killing means for killing organisms adhered to the inner wall surfaces of the non-filtrate chamber.

Sea water to be filtrated is pumped, and there were provided a filtrate channel and a non-filtrate channel as a control. The flow rates and amounts of these channels were controlled to be identical. Plates having an area of 0.25 m² were disposed in channels, respectively, and the effect for removing larvae attached to the plates by filtering was determined by checking the presence/absence of larvae of Mussels and Balanus which were included in the planktons.

The experiment was conducted in Sendai Bay, Miyagi Prefecture for 75 days from April to June. The volume of salt water passed through each channel in 75 days was about 4,000 m³. Table 1 shows the number of shells attached to the plates. Mussels were attached to the plate disposed in the non-filtrate channel. However, no Mussels were adhered to the plate disposed in the filtrate channel.

Barnacles were adhered to neither plates because the growing period was not reached. The size of Balanus larvae is 600 to 1,000 μm which is larger than that (300 to 400 μm) of Mussels. Thus, the Balanus larvae are not assumed to pass through the slits of the filter elements, and Balanus larvae are not likely to pass toward the filtrate side in the growing period.

Hot water having a temperature of 60° C. was used to remove shells adhered to the non-filterate chamber and was filled in the non-filtrate chamber. When one hour has elapsed, the death/live conditions of the shells in the chamber were checked. All shells were confirmed to be dead.

TABLE 1

|  | Plate in Non-Filtrate Population | Plate in Filtrate Population |
|---|---|---|
| Mussels | about 20 | 0 |
| Balanus | 0 | 0 |

Table 2 shown below indicates the populations of planktons in the sea water and the sea water filtrate.

TABLE 2

|  | Population of plankton in sea water (number/m³) | Population of plankton in sea water filtrate (number/m³) | Remarks |
|---|---|---|---|
| Zooplankton | 19,440 | 5,160 | Planktons smaller than 50 μm being passed through |
| Larvae of Zooplankton | 2,800 | 1,520 | Planktons smaller than 50 μm being passed through |

According to the filter apparatus of the present invention, the microorganisms floating in salt water which cannot be easily captured according to the conventional techniques can be directly condensed alive in a non-filtrate reservoir portion in the filter chamber. In particular, when the slit size or void diameter of the filter element is 300 μm or less, all planktons such as Mussels entering the cooling water passageway of a steam power plant to foul the inner wall of the cooling water passageway and, thus, to lower the power generation efficiency, can be separated and recovered. Therefore, instead of killing all the ocean microorganisms adhered or attached to the inner wall surfaces of the water supply pipe or the steam condenser in the conventional techniques, the planktons can be separated and captured in the reservoir portion and be used as a natural feed for ocean culture for fishes and shells. The ocean microorganisms can also be released alive back to the sea, and thus an ecosystem for ocean organisms can be preserved. In addition, a toxic chemical, an organic paint, or the like which contaminates the ocean environments need not be used, thus preventing adverse influences on ocean organisms and environmental pollution. The safety of ocean environments can be assured. A large amount of expenses consumed according to the conventional techniques can be reduced to the maintenance expenses of the filter apparatus of the present invention.

In the above embodiment, the filter elements are vertically suspended on the tube plate in the filter chamber. However, the filter elements may be horizontally arranged to obtain the same effect as described above. The present invention is not limited to filtering of saltwater planktons but can be extended to that of freshwater planktons.

What is claimed is:

1. A filter apparatus for removing plankton from fresh/salt water containing plankton, comprising:

a filter housing partitioned, by a partition plate having a plurality of through-holes, into a non-filtrate chamber and a filtrate chamber, said non-filtrate and filtrate chambers having far ends with openings, and said non-filtrate chamber having a plankton-removing opening near said partition plate; and a plurality of filter elements each having one end which is open and another end which is sealed, and a filtering portion having a plurality of openings therein, said openings of said filter elements being dimensioned to prevent planktons from passing therethrough, said one end of each filter element being fitted in and supported by a corresponding one of through-holes of said partition plate, and said another end of each filter element extending toward said opening of said far end of said non-filtrate chamber; and plankton collecting means coupled to said plankton-removing opening for collecting live plankton therein;

wherein the plankton in water to be filtered are concentrated near said partiton plate of said non-filtrate chamber, are removed through said plankton-removing opening near said partition plate, and are collected in a live state in said plankton collecting means.

2. An apparatus according to claim 1, wherein a portion near said partition plate of said filter element extending in said non-filtrate chamber comprises a non-filter portion without openings therein, to thereby form a water standing area where planktons are readily collected.

3. An apparatus according to claim 1, wherein a cross-sectional dimension of said openings of said filter elements is not more than 300 $\mu$m.

4. An apparatus according to claim 1, wherein each of said filter elements is cylindrical and includes a substantially cylindrical member, and said opening therein are defined by intervals between turns of a wire wound around said substantially cylindrical member.

5. An apparatus according to claim 1, wherein each of said filter elements comprises a columnar body and a large number of annular bodies stacked and inserted in said columnar body, and said openings therein are formed between said annular bodies.

6. An apparatus according to claim 1, wherein each of said filter elements comprises a box-like shaped member, and a large number of through-holes formed at least on both side surfaces of said box-like member.

7. A filter apparatus for removing plankton from fresh/salt water containing plankton, comprising:

a filter housing partitioned, by a partition plate having a plurality of through-holes, into a non-filtrate chamber and a filtrate chamber, said non-filtrate and filtrate chambers having far ends with openings, and said non-filtrate chamber having a plankton-removing opening near said partition plate;

a plurality of filter elements each having one end which is open and another end which is sealed, and a filtering portion having a plurality of openings therein, said openings of said filter elements being dimensioned to prevent planktons from passing therethrough, said one end of each filter element being fitted in and supported by a corresponding one of through-holes of said partition plate, and said another end of each filter element extending toward said opening of said far end of said non-filtrate chamber;

plankton collecting means coupled to said plankton-removing opening for collecting live plankton therein; and a reverse washing fluid tank arranged to communicate with said filtrate chamber, said reverse washing fluid tank supplying at least reverse washing salt water or fresh water;

wherein the plankton in water to be filtered are concentrated near said partition plate of said non-filtrate chamber, are removed through said plankton-removing opening near said partition plate, are collected in a live state in said plankton collecting means, and objects stacked on a surface of said filtering portions of said filter elements are recovered by a bubble flow prepared by blowing reverse washing air into reverse washing salt water or fresh water.

8. An apparatus according to claim 7, wherein said reverse washing fluid tank is coupled to a reverse washing air tank and to a reverse washing water tank.

9. A filter apparatus for removing plankton from fresh/salt water containing plankton, comprising:

a filter housing partitioned, by a partition plate having a plurality of through-holes, into a non-filtrate chamber and a filtrate chamber, said non-filtrate and filtrate chambers having far ends with openings, and said non-filtrate chamber having a plankton-removing opening near said partition plate;

a plurality of filter elements each having one end which is open and another end which is sealed, and a filtering portion having a plurality of openings therein, said one end of each filter element being fitted in and supported by a corresponding one of through-holes of said partition plate, and said another end of each filter element extending toward said opening of said far end of said non-filtrate chamber; and a killing fluid tank storing a killing fluid and arranged to communicate with said non-filtrate chamber;

wherein the plankton in water to be filtered are concentrated near said partition plate of said non-filtrate chamber and are recovered through said plankton-removing opening near said patition plate, and organism fouling said non-filtrate chamber are removed by pouring the killing fluid in said killing fluid tank into said non-filtrate chamber.

10. A filter apparatus according to claim 9, wherein said killing fluid comprises hot water heated to 40° C. or more.

11. A filter apparatus according to claim 9, wherein said killing fluid comprises hot steam heated to 40° C. or more.

* * * * *

UNITED STATES PATENT AND TRADEMARK OFFICE
CERTIFICATE OF CORRECTION

PATENT NO. : 4,830,747
DATED : May 16, 1989
INVENTOR(S) : KUBOTA et al

It is certified that error appears in the above-identified patent and that said Letters Patent is hereby corrected as shown below:

In the title page of the patent, the name of the second Assignee should read:

--Tohoku Electric Power Company, Incorporated--.

Signed and Sealed this

Ninth Day of October, 1990

*Attest:*

HARRY F. MANBECK, JR.

*Attesting Officer*      *Commissioner of Patents and Trademarks*